US011428415B2

(12) United States Patent
Becker et al.

(10) Patent No.: US 11,428,415 B2
(45) Date of Patent: Aug. 30, 2022

(54) GAS APPLIANCE IGNITION MODULE

(71) Applicant: Channel Products, Inc., Solon, OH (US)

(72) Inventors: James S. Becker, Chardon, OH (US); Florin N. Lazar, Parma, OH (US)

(73) Assignee: Channel Products, Inc., Solon, OH (US)

( * ) Notice: Subject to any disclaimer, the term of this patent is extended or adjusted under 35 U.S.C. 154(b) by 39 days.

(21) Appl. No.: 16/667,031

(22) Filed: Oct. 29, 2019

(65) Prior Publication Data

US 2020/0063969 A1    Feb. 27, 2020

Related U.S. Application Data

(63) Continuation of application No. 15/146,437, filed on May 4, 2016, now Pat. No. 10,495,316.

(60) Provisional application No. 62/386,004, filed on Nov. 16, 2015.

(51) Int. Cl.
  *F24C 3/10*   (2006.01)
  *F23Q 3/00*   (2006.01)
  *A47J 43/28*  (2006.01)
  *A47J 37/07*  (2006.01)

(52) U.S. Cl.
  CPC ............. *F24C 3/103* (2013.01); *A47J 43/283* (2013.01); *F23Q 3/006* (2013.01); *A47J 37/0713* (2013.01); *A47J 37/0727* (2013.01)

(58) Field of Classification Search
  CPC .................................................. F24C 3/103
  See application file for complete search history.

(56) References Cited

U.S. PATENT DOCUMENTS

| 6,550,469 B2 | 4/2003 | Hsu |
| 2002/0148460 A1 | 10/2002 | Hsu |
| 2003/0082953 A1 | 5/2003 | Ushio et al. |

(Continued)

FOREIGN PATENT DOCUMENTS

| CN | 2 090 937 U | 12/1991 |
| CN | 2580327 Y | 10/2003 |

(Continued)

OTHER PUBLICATIONS

PCT International Search Report and Written Opinion from International Application No. PCT/US2016/030747, dated Aug. 17, 2016, 19 pages.

(Continued)

*Primary Examiner* — Jason Lau
(74) *Attorney, Agent, or Firm* — Tucker Ellis LLP; Heather M. Barnes; Michael G. Craig

(57) ABSTRACT

One or more techniques and/or systems are disclosed for an ignition control module for a gas appliance. The housing of the ignition control module, and/or the mounting points for mounting the module to a gas appliance, can be configured to dispose the battery in a manner that provides for potential battery leakage to flow away from most operable components of the module. Further, the ignitor connection terminals can be configured to provide for ease of connection, by providing a connector guide disposed in a cylindrically shaped terminal housing. Additionally, an ignitor actuator terminal can be configured to selectable engage with an ignitor actuator connector, where the ignitor actuator terminal comprises at least two connector points that engage with a single ignitor actuator connector.

16 Claims, 13 Drawing Sheets

(56) References Cited

U.S. PATENT DOCUMENTS

2003/0148655 A1    8/2003   Bluhm et al.
2008/0206692 A1    8/2008   Hsieh

FOREIGN PATENT DOCUMENTS

| CN | 201753941 U | 3/2011 |
|----|-------------|--------|
| EP | 0219205 A1  | 4/1987 |
| EP | 0219205 B1  | 12/1991 |
| GB | 483291 A    | 4/1938 |
| JP | S53 24774 U2 | 3/1978 |
| JP | 61-017834 A | 1/1986 |
| JP | H04 29702 U | 3/1992 |
| RU | 2486411 C2  | 6/2013 |

OTHER PUBLICATIONS

Extended European Search Report for corresponding EP Application No. 16866780.6, dated Sep. 13, 2019, 11 pages.
Repair New Weber Gas BBQ Grill Igniter Module and Electrode, Feb. 23, 2011, 10 pages.
Yong Shen, Battery Gas Igniter, 1 page.

GAS APPLIANCE IGNITION MODULE

CROSS-REFERENCE TO RELATED APPLICATIONS

This continuation application claims priority to nonprovisional application having application Ser. No. 15/146,437, entitled GAS APPLIANCE IGNITION MODULE, filed May 4, 2016, and which claims priority to provisional application having application No. 62/386,004, entitled GAS GRILL IGNITION MODULE, filed Nov. 16, 2015, which is incorporated herein by reference.

BACKGROUND

Gas appliances, such as gas grills and other cooking devices, often utilize ignitors mounted onto the appliance. Some are powered by a power source, such one or more batteries, and such devices typically comprise a control module to control the ignition source. An ignition module can comprise or be coupled with an actuator switch, used by a user, and one or more ignitors, for igniting the fuel. The module itself is often mounted on the appliance, and it can be mounted in a variety ways. For example, some modules have the actuator switch engaged with the module, while others have a connector, such as a wire, leading from the switch to a remotely mounted module. Modules with the actuator switch, such as a button, directly engaged with the module typically utilize a battery compartment that protrudes through the panel of the appliance to which the module is mounted. In any event, the battery within the module can provide electrical power to an electronic circuit therein in order to generate a voltage potential. If the voltage is applied to an electrode (e.g., in the ignitor), and the voltage is sufficiently large enough, the air across a gap on the electrode will be ionized and a spark will be generated, thereby enabling an air/gas mixture surrounding the gap to be ignited.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, an ignition control module for a gas appliance can be devised that provide for controlling an ignition source for the gas appliance, such as when an ignition actuator switch is activated by a user of the appliance. The ignition control module can be configured to provide for ease of installation and use by providing improved connection points for respective ignitor connectors and/or actuator switch connection. Further, the ignition control module can be configured to provide for mitigating exposure to potential contaminants, such as introduced by accident, environmental condition, during use, and/or battery material leakage. For example, the battery can be disposed in a position that reduces potential damage from leaks; and the connection points can be protect from exposure.

In one implementation, an exemplary ignition module for use on a gas appliance can comprise a base housing. The base housing can be configured to be fixedly mounted on the gas appliance. Further, the exemplary ignition module can comprise a battery compartment that is engaged with the base housing. The battery compartment can be configured to hold a battery in its operable position when the base housing is mounted for operation on the gas appliance. Additionally, when the module is mounted for operation, the battery compartment can be configured to dispose the battery's negative terminal at a lower elevation than the battery's positive terminal. The battery compartment can comprise a battery access portion that operates to selectably access the battery compartment, such as to install or remove a battery.

In another implementation, an exemplary device for controlling an ignition source in a gas appliance can comprise a housing. The housing can be configured to enclose, at least partially, one or more control components disposed therein. Further, the exemplary device for controlling an ignition source in a gas appliance can comprise one or more ignitor terminals that are engaged with the housing. The one or more ignitor terminals can respectively comprise an ignitor terminal connector that is configured to selectably, operably couple with a corresponding ignitor connector. Additionally, the one or more ignitor terminals can respectively comprise a cylindrically shaped ignitor terminal housing. The ignitor terminal housing can comprise an ignitor connector guide that is disposed at an opening to the ignitor terminal housing. The ignitor connector guide can be configured to guide the corresponding ignitor connector to the ignitor terminal connector for insertion of the ignitor connector into the ignitor terminal. The insertion of the ignitor connector into the ignitor terminal can result in an electrical connection between the device and an ignitor.

In another implementation, a gas appliance ignition apparatus can comprise a housing. The housing can be configured to enclose, at least partially, one or more control components disposed therein. Further, the exemplary device for controlling an ignition source in a gas appliance can comprise one or more ignitor terminals that are engaged with the housing. Additionally, the exemplary device for controlling an ignition source in a gas appliance can comprise an ignitor actuator terminal that is engaged with the apparatus housing. The ignitor actuator terminal can be configured to selectably engage with an ignitor actuator connector. The ignitor actuator terminal can comprise an ignitor actuator terminal connector that comprises at least two terminal electrical connection points. The ignitor actuator terminal can also comprise an ignitor actuator terminal housing that is configured to selectably receive the ignitor actuator connector. The ignitor actuator terminal housing receiving the ignitor actuator connector can result in an electrical connection between the ignition apparatus and an ignitor actuator.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
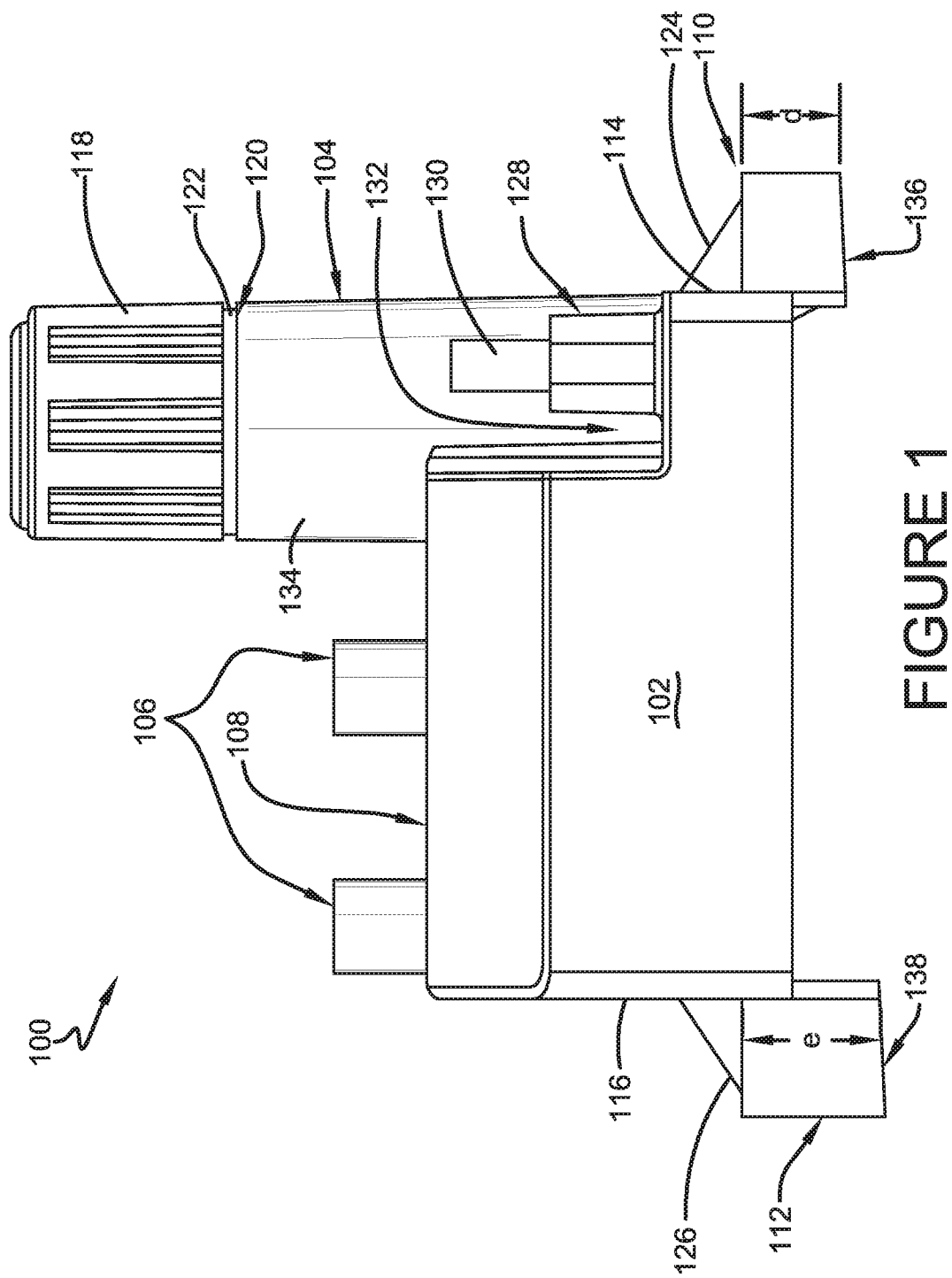
FIG. 1 is a component diagram illustrating a front elevation view of an exemplary ignition control module in accordance with one or more devices described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

The term "gas," as in gas appliance or gas grill, or a gas fuel used in said systems, may be used in furtherance of disclosure of the details of the claimed ignition module device or apparatus. It should be noted that the term "gas" may refer to a flammable gas, such as propane, natural gas, or the like; and/or a flammable mixture of air and vapors or air entrained droplets of a flammable liquid, such as kerosene, lighter fluid, or the like; or any such combination. In general, the term "gas" can refer to a fuel used in a gas appliance of any kind.

As described herein, an ignition module device or apparatus may be devised for installation on a gas appliance, such as a gas grill or the like, for example. In one implementation, such an ignition module can be configured to use a battery as a power source to provide an ignition source, such as a spark, upon actuation, such as by a user of the gas appliance. For example, a gas appliance (e.g., gas grill) may comprise an actuator switch (e.g., button) coupled with the ignition module. Activating the switch (e.g., pressed) can result in the ignition module sending an electrical charge to a coupled ignitor, disposed proximate a gas burner. In this example, the electrical charge sent to the ignitor can result in a spark, which acts as the ignition source to ignite gas released from the burner. In one implementation, such a device can be installed on a gas appliance that is subjected to environmental conditions which can result in a shortened life for the module. In this implementation, an example ignition module may comprise a configuration that mitigates exposure to deleterious environmental conditions, and/or is configured to provide for extended life when exposed to such conditions.

Figure 4A:
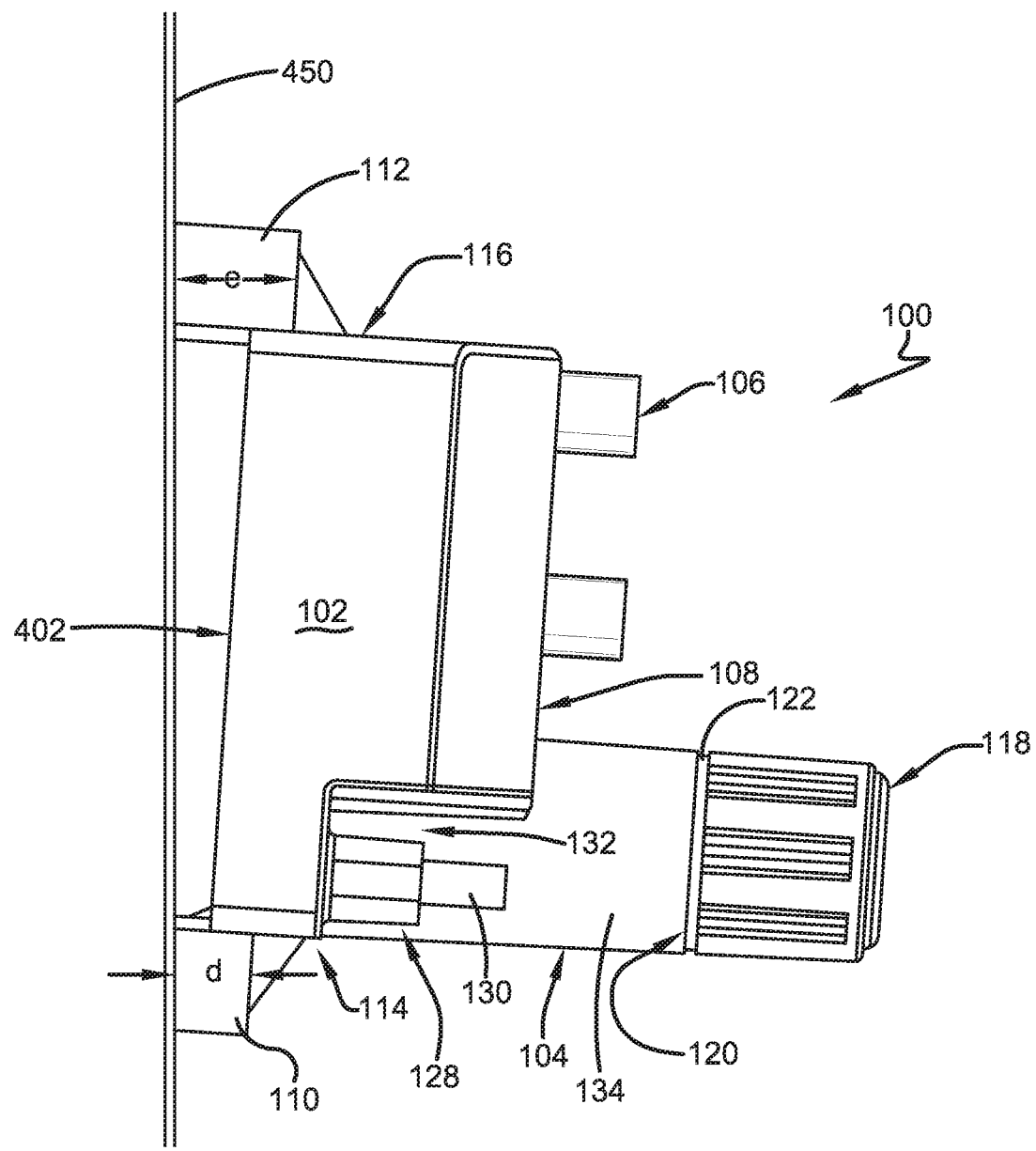
FIGS. 4A, 4B, and 4C are component diagrams illustrating example implementations of one or more portions of one or more components described herein.
Figure 4B:
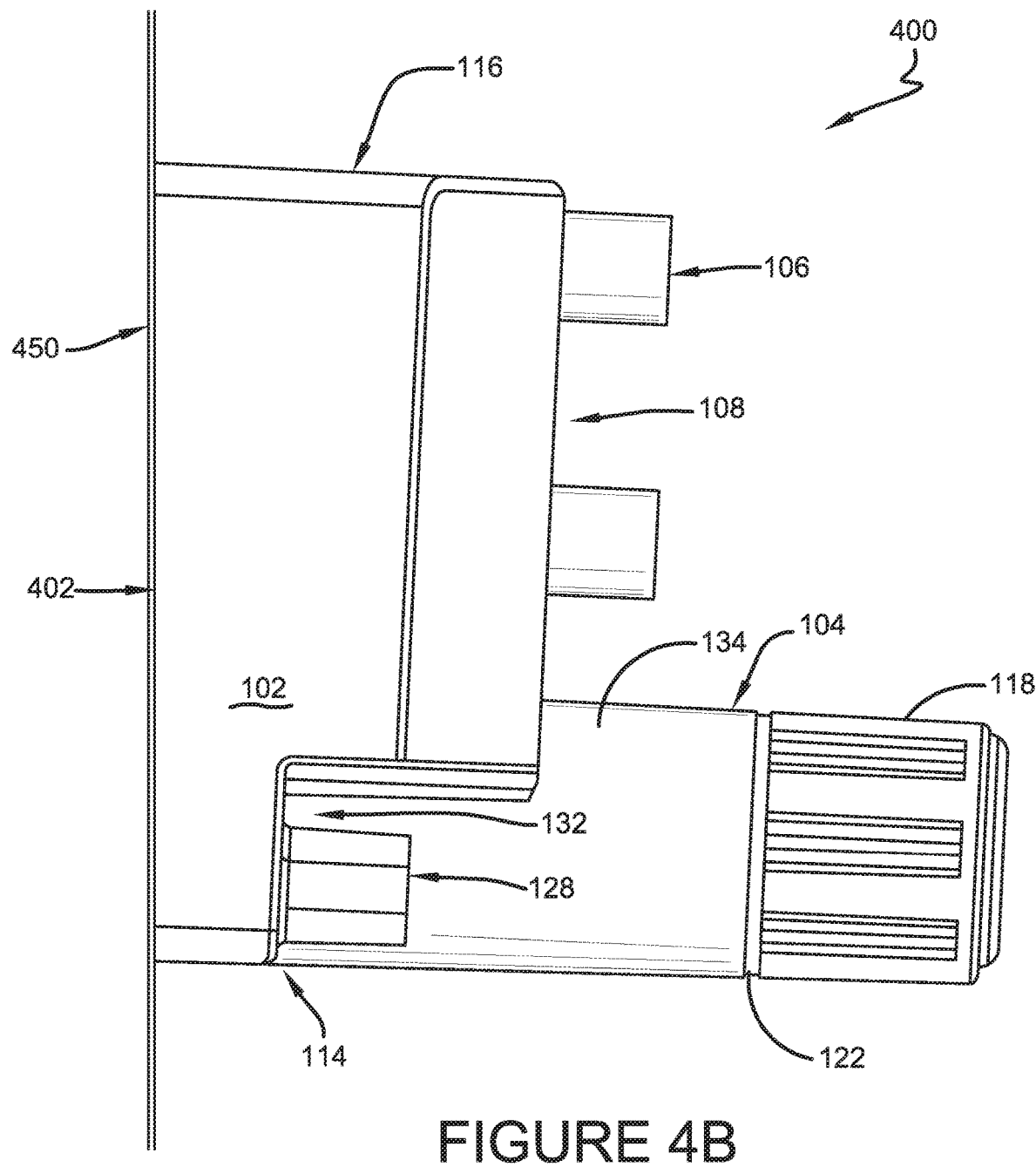
Figure 4C:
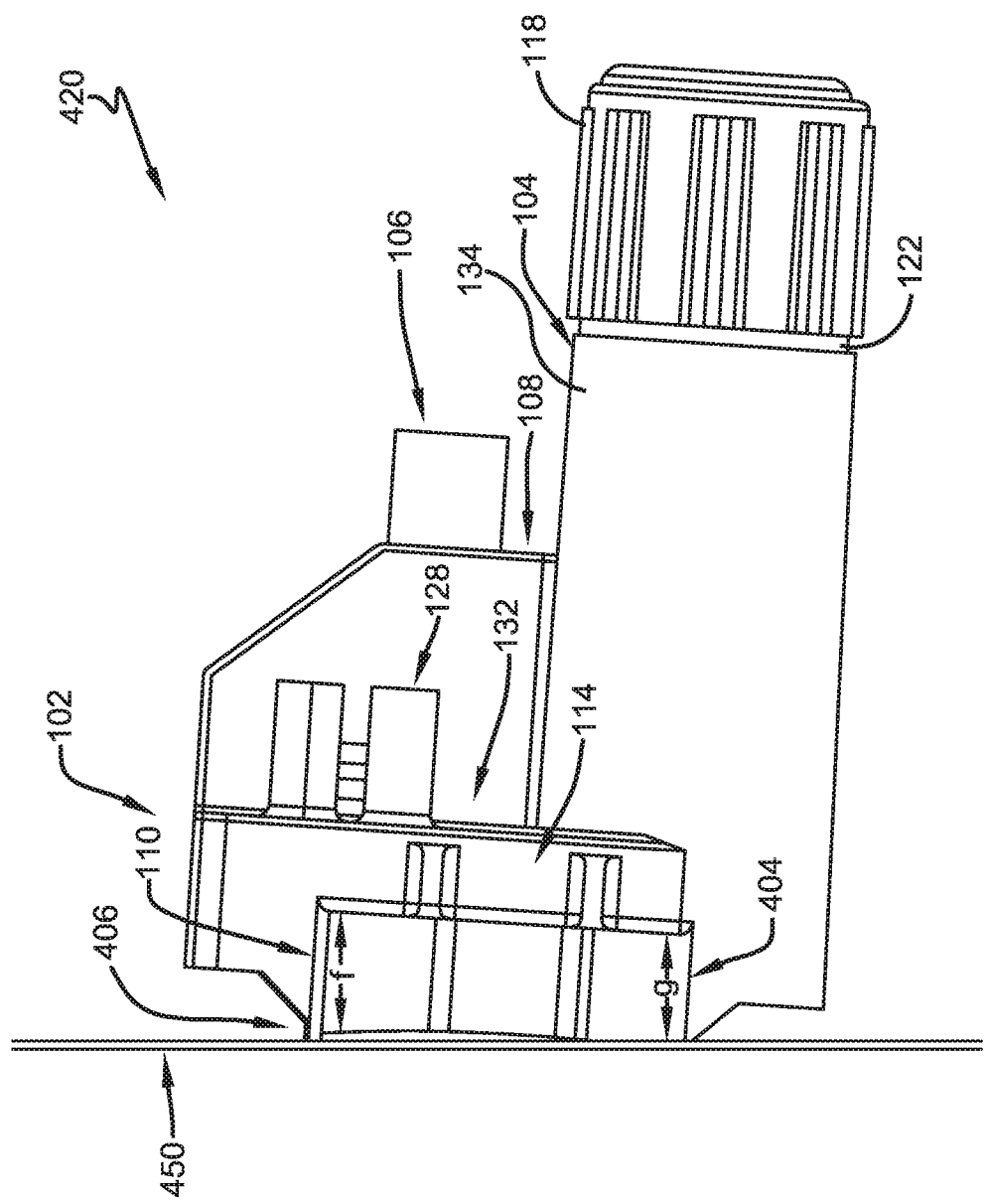

FIGS. 1, 2, 3, 4A, 4B, 4C, 5, 6A and 6B are component diagrams illustrating an exemplary ignition module device or apparatus 100 in various views, and implementations. In one implementation, in FIGS. 1, 2, 3 and 4A an exemplary ignition module 100 can comprise a base housing 102 that is configured to be fixedly mounted on a gas appliance surface 450. As an example, an ignition module may be mounted on an under surface of a gas grill, such as proximate the burner controls, ignition switch, and/or under the grill cooking area itself; usually, at least partially covered by a portion of the grill (e.g., shelf, cover, control mounting surface, etc.). In one implementation, as illustrated in FIGS. 4A, 4B, and 4C, the base housing 102 can be mounted on a gas appliance vertical surface 450.

As illustrated in FIGS. 1-4A, the exemplary ignition module 100 can comprise a battery compartment 104 that is engaged with the base housing 102. The battery compartment 104 can be configured to hold a battery in its operable position, such as during use, when mounted on the gas appliance, for example. Further, the battery compartment 104 can be configured to dispose the battery's negative terminal at a lower elevation than the battery's positive terminal, when the base housing 102 is mounted for operation on the gas appliance surface 450.

Figure 7:
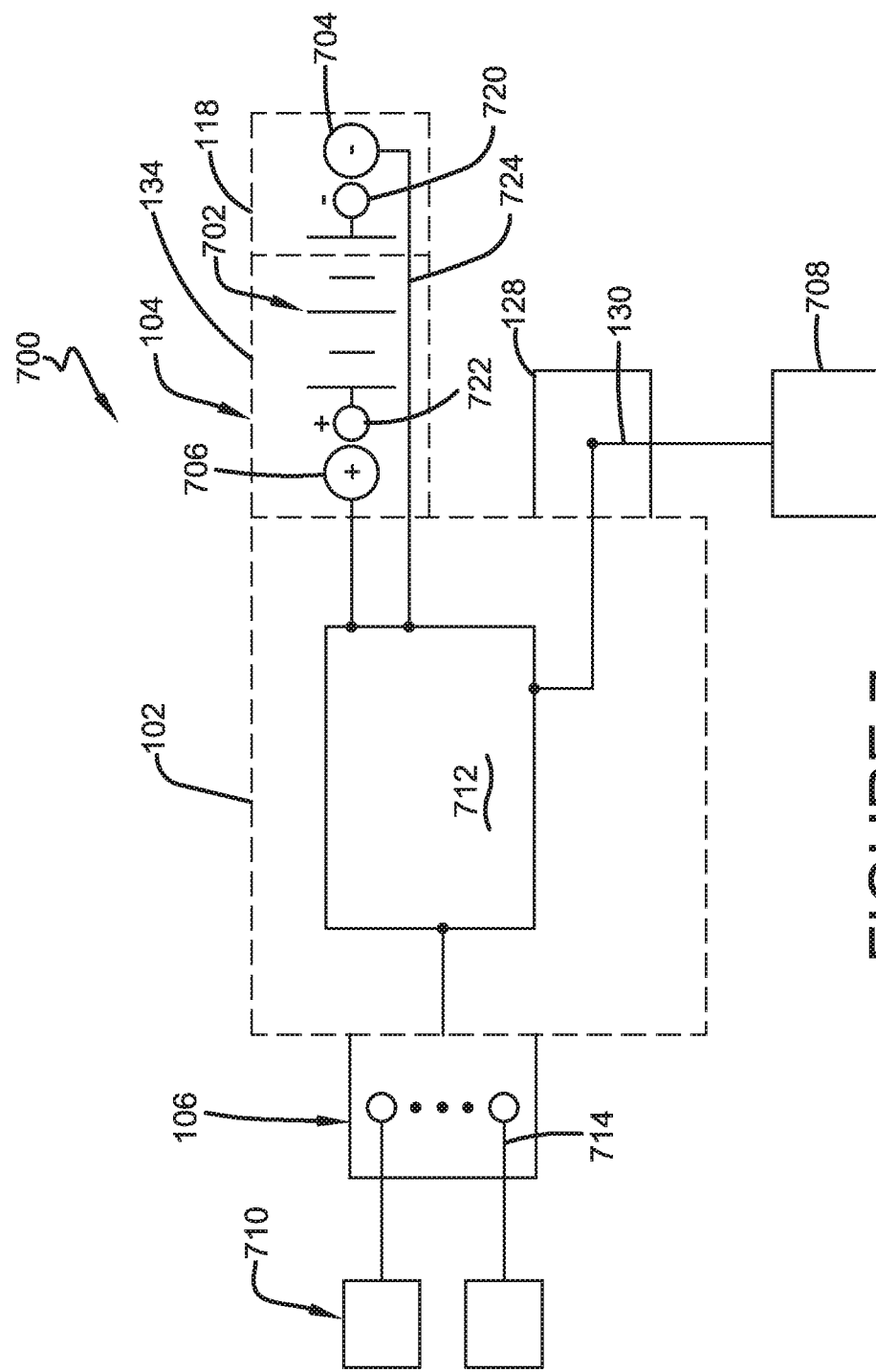
FIG. 7 is a schematic diagram illustrating an example implementation of one or more portions of one or more components described herein.

For example, as illustrated in FIG. 7, a schematic diagram depicts an example implementation of an ignition control module 700. In this example implementation, the battery compartment 104 can hold a battery 702 comprising a negative terminal 720 and a positive terminal 722. In one or more implementations, as illustrated in FIGS. 4A, 4B, and 4C, when the example ignition module 100, 400, 420 is mounted in an operable position, the central axis of the battery compartment 104 can be disposed at angle from a vertex point at the mounting surface 450 that provides a downward slope from horizontal. That is, for example, the battery compartment slopes downward toward the distal end. In this way, in this implementation, the negative terminal 720 of the battery 702 can be disposed at a lower elevation than the positive terminal 722.

Commonly, batteries comprise a design that disposes the negative terminal at a first end/side of the battery, and the positive terminal at a second, opposing end/side of the battery. Further, some batteries (e.g., cylindrical style) are formed with a tube portion and a cap, where the tube portion contains a substantive portion of the electro-chemical materials, and the cap seals the end of the tube to mitigate leakage of chemicals. Typically, the closed end of the tube portion comprises the positive terminal, and the cap comprises the negative terminal of the battery. For this reason, for example, when leakage occurs from a battery, it typically occurs proximate the negative terminal, as the cap is a potential weak point in the battery's seal. Materials leaked from a battery can comprise corrosive chemicals that often result in damage to the equipment utilizing the battery. Therefore, disposing the negative terminal of the battery at a lower elevation than the positive terminal may limit exposure to potentially leaked materials to merely the negative terminal end of the battery.

In one implementation, the battery compartment 104 can comprise a battery access portion 118, disposed at a first end of the battery compartment 104. The battery access portion 118 can be operable to selectably access the battery compartment 104. For example, devices that utilize batteries typically comprise an access point for installing and/or replacing batteries, particularly if there is no means for recharging a battery in place, in the device. A battery compartment access can comprise a variety of designs that are selected, based on suitability for the intended purpose of the host device. For example, for an ignition control module, the battery access portion 118 may be readily accessible, and provide for ease of use, as the module may be mounted in a location that is not easily accessed (e.g., hidden behind an appliance partition or component).

In this implementation, the battery access portion 118 may comprise a graspable surface; and, in conjunction with a body portion 134, disposed at a second end of the battery compartment 104, can comprise an engagement component that allows the battery access portion 118 to be selectably opened and closed. As an example, the battery access portion 118 may be selectably engaged with the body portion 134 of the battery compartment 104 using a threaded fitting, clasp(s), fastener(s), clip, or other similar means, with or without a hinge apparatus. The body portion 134 of the battery compartment 104 may be removed from the body portion 134 of the battery compartment 104, or the battery compartment 104 may remain, at least partially, engaged with the body portion 134 of the battery compartment 104, such as by use of a hinge-like mechanism.

In one implementation, as illustrated in FIGS. 1-4, the battery access portion 118 may comprise a cap that can be engaged with the body portion 134 of the battery compartment 104, where the battery compartment 104 projects from the housing 102 of an example module 100, 400, 420. It should be noted that, although the example implementations illustrated disclose the battery compartment 104 projecting from the base housing 102 orthogonally from a longitudinal axis of the base housing 102, it is anticipated that alternate implementations may be devised by those skilled in the art. For example, the central axis of the battery compartment 104 may be disposed in parallel with the central or longitudinal axis of the base housing 102; or the central axis of the battery compartment 104 may be disposed in parallel with the lateral axis of the base housing 102. In these examples, the module can be mounted on the appliance surface in such a manner that provide for the negative terminal of the battery being disposed at a lower elevation than the positive terminal.

In one implementation, as illustrated in FIG. 7, the battery access portion 118 of the battery compartment 104 can comprise a negative electrical contact terminal 704 for the ignition module 700. In this implementation, a positive electrical contact terminal 706 for the ignition module 700 can be fixedly disposed at an opposing end of the battery compartment 104, such as in the battery compartment body portion 134. That is, for example, the battery compartment can comprise a cylindrically shaped tube for holding a cylindrically shaped battery (e.g., AA, AAA, C, D sized), with its terminals 720, 722 disposed at opposite ends. In this example, the negative electrical contact terminal 704, for contacting the battery's negative terminal 720, can be in the access end of the battery compartment 104, such as in a cap-shaped battery access portion 118. Additionally, the positive electrical contact terminal 706 can be disposed at the other end of the battery compartment, such as in the body portion 134.

In one implementation, the body portion 134, comprising the positive electrical contact terminal 706, can be proximate (e.g., and fixedly engaged with) the base housing 102. Further, the negative electrical contact terminal 704 can be disposed in the battery access portion 118, for example, which may protrude away from the base housing 102.

Additionally, the base housing can comprise the ignition control module 712, for example, which may comprise circuits, processors, and/or other electrical components, used to control electrical signals sent to one or more ignitors 710 used in the gas appliance. In this implementation, disposing the negative electrical contact terminal 704, and therefore the battery's negative terminal 720, away from the ignition control module 712 may mitigate leaked material from the battery 702 potentially contacting the ignition control module 712.

That is, for example, when the ignition module is operably mounted on the gas appliance, the battery's negative terminal 720 is disposed at a lower elevation than the battery's positive terminal 722. In this example, resulting leaked material (e.g., likely leaked from the battery's negative terminal 720) will flow down, away from the positive electrical contact terminal 706, and therefore, away from the ignition control module 712. In this way, potential damage to the ignition control module 712 resulting from corrosive battery material, for example, may be mitigated.

In one implementation, the battery access portion 118 can comprise a selectably removable cap that is configured to collect material leaked from a battery 702 disposed in the battery compartment 104. For example, as described above, material may leak from the battery 702 (e.g., typically at the negative terminal end 720); and, when the negative terminal 720 is disposed at a lower elevation than the positive terminal 722, the leaked battery material may flow downward toward the negative end. In this example, the negative electrical contact terminal 704 can be disposed in the cap-shaped battery access portion 118, which may collect any leaked material from the battery. In this way, for example, if one or more portions of the cap-shaped battery access portion 118 are damaged due to exposure to the leaked (e.g., corrosive) battery material, the cap may simply be replaced (e.g., or cleaned), instead of replacing more expensive portions (e.g., or all) of the ignition module.

In one implementation, the battery access portion 118 can comprise an electrical coupler 724 that is configured to electrically couple the negative electrical contact terminal 704 in the battery access portion 118 with the ignition control module 712 when the battery access portion 118 is selectably engaged with the body portion 134 of the battery compartment 104. That is, for example, the battery access portion 118 may be configured to be selectably removed from the battery compartment 104, and selectably re-engaged with the battery compartment 104. In this implementation, for example, the negative electrical contact terminal 704 can be electrically coupled with a first portion (e.g., a wire, such in a spring shape, or other electric al contact) of the electrical coupler 724, disposed in the battery access portion 118, and a second portion of the electrical coupler 724 can be disposed in the body portion 134 of the battery compartment 104. In this implementation, when the battery access portion 118 (e.g., cap) is engaged with the body portion 134, the first portion of the electrical coupler 724 may electrically couple with the second portion of the electrical coupler 724. In this way, for example, the negative electrical contact terminal 704 can be in electrical coupling with the ignition control module 712 when the battery access portion 118 is engaged with the body portion 134 of the battery compartment 104.

In one implementation, as illustrated in FIGS. 1-4, the example module 100, 400, 420 can comprise a gasket 122 disposed on the battery compartment. In this implementation, the gasket 122 can be disposed between the battery access portion 118 and the body portion 134 of the battery compartment 104, and be configured to engage with the battery access portion 118 to mitigate migration of contaminants between the outside and inside of the battery compartment 104. That is, for example, the gasket 122 may mitigate entry of environmental contaminants (e.g., water, dust, dirt, grease, food or other particles) into the battery compartment 104. Further, the gasket 122 may mitigate leaked battery materials from flowing out of the battery compartment 104.

In one aspect, as illustrated in FIGS. 1-4, the example ignition module 100, 400, 420 can be mounted on a gas appliance, such as on a vertical surface 450 of the appliance. In one implementation, in this aspect, the base housing 102 can comprise one or more module mounting point components 110, 112, that are respectively configured to be used to mount the base housing 102 on a vertical surface 450 of the appliance. In this implementation, the one or more module mounting point components 110, 112 are configured to mount the base housing 102 such that a first end of the battery compartment, comprising the battery access portion 118, is disposed at a lower elevation than an opposing, second end of the battery compartment, comprising the body portion 134. That is, for example, the mounting point components 110, 112, when mounted, may dispose the battery compartment 104, and/or the base housing 102 engaged with the battery compartment 104, at angle that provides a downward slope to the battery compartment 104. In this way, in this example, any fluids leaked from a battery in the battery compartment 104 can flow down toward the distal end of the battery compartment 104.

In one implementation, the one or more module mounting point components can comprise a first module mounting foot 110 and a second module mounting foot 112. In this implementation, the second module mounting foot 112 can comprise a greater thickness "e" than the thickness "d" of the first module mounting foot 110. In this implementation, the measured thickness for the respective feet 110, 112, can be measured from a mounting surface 136, 138 of the respective module mounting feet 110, 112. As an example, when the ignition module 100 is mounted on a gas appliance vertical surface 450 a first end 114 of the module may be disposed below a second end 116 of the module. In this example, the first mounting foot 110 may also be disposed below the second mounting foot 112. As illustrated in FIG. 4A, the greater thickness "e" of the second mounting foot 112, when compared to the thickness "d" of the first mounting foot 110, can dispose the battery compartment 104 at a downward slope, as described above, when the feet 110, 112 are mounted to the vertical surface 450.

Figure 2:
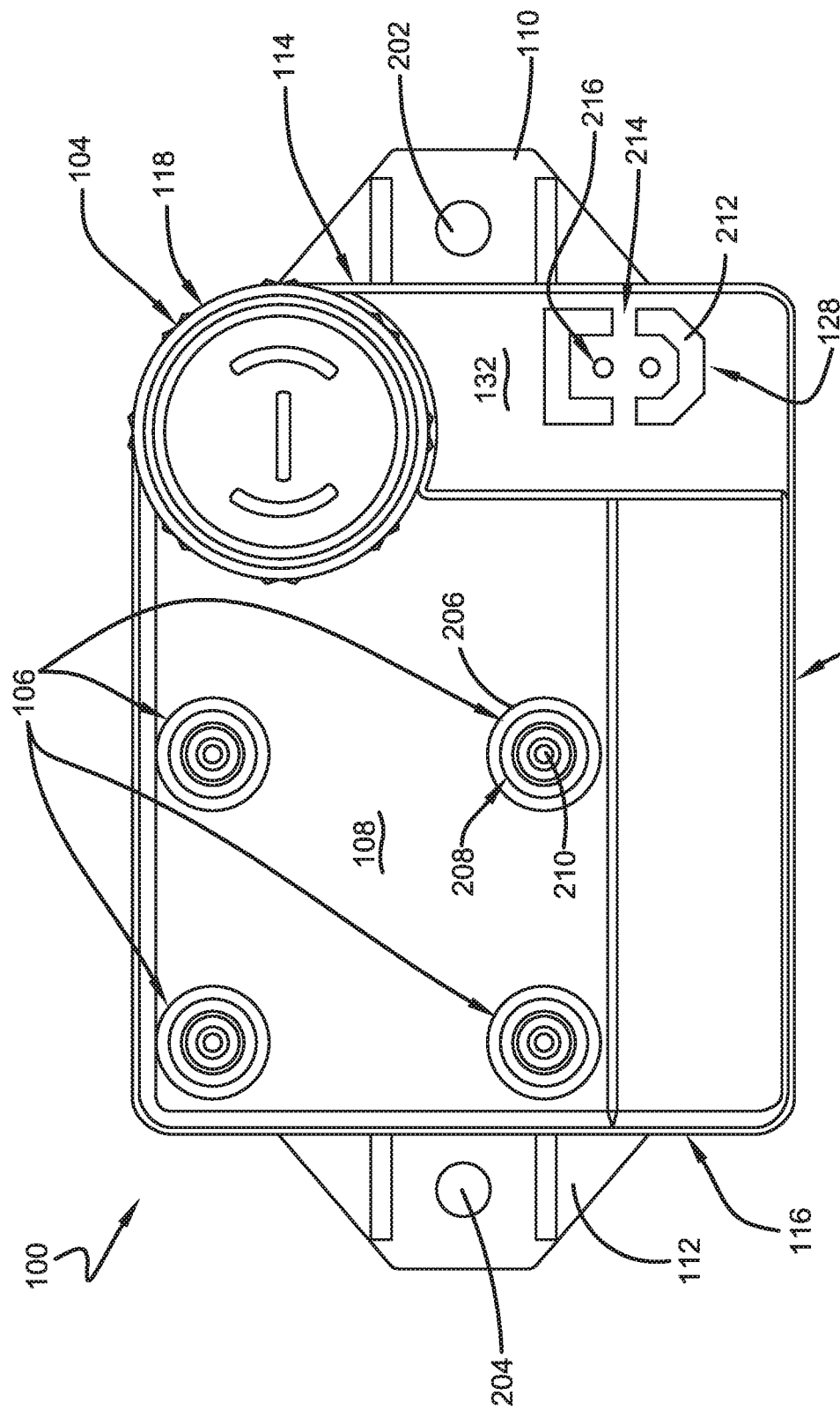
FIG. 2 is a component diagram illustrating a top view of an exemplary ignition control module in accordance with one or more devices described herein.
Figure 3:
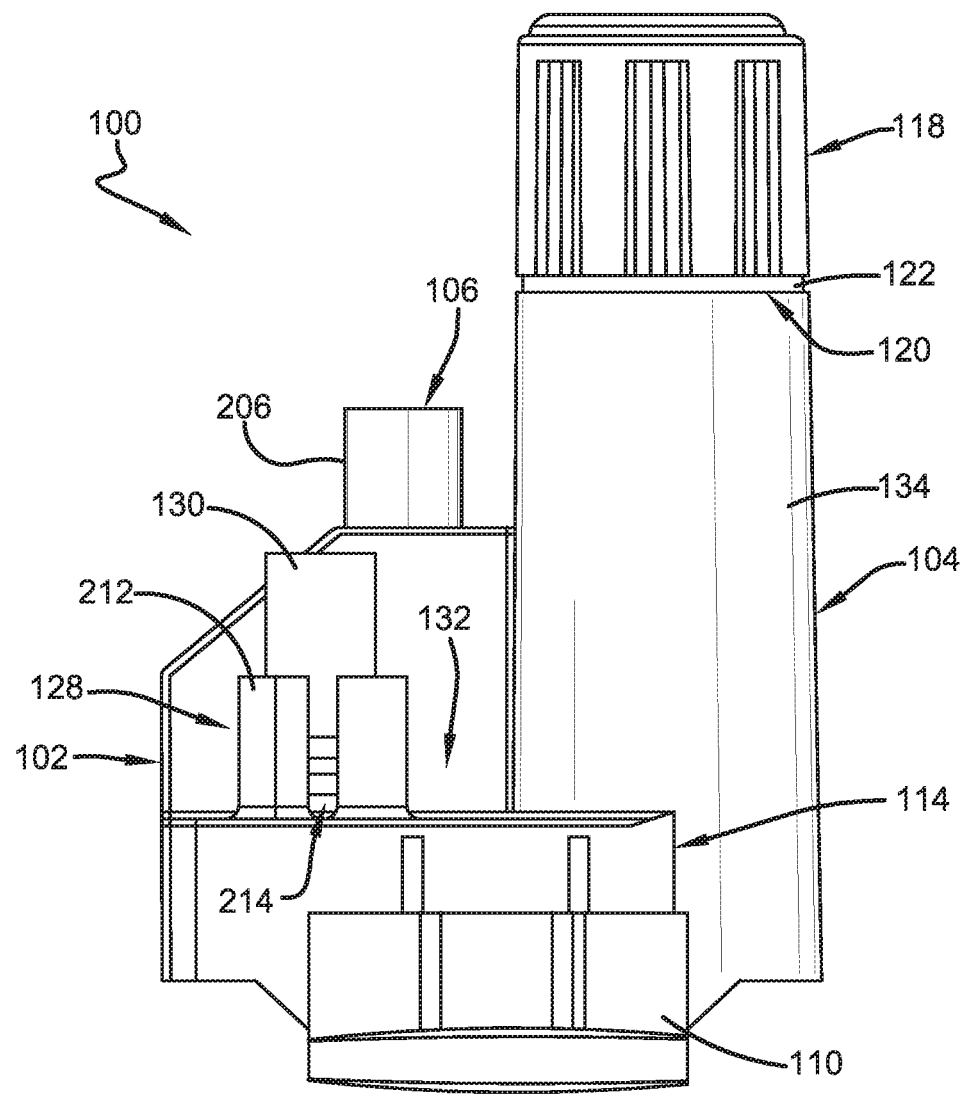
FIG. 3 is a component diagram illustrating a side elevation view of an exemplary ignition control module in accordance with one or more devices described herein.

In one implementation, as illustrated in FIG. 2, the respective mounting points 110, 112 can comprise an aperture 202, 204. That is, the first mounting point 110 can comprise a first aperture 202, and the second mounting point 112 can comprise a second aperture 204 (e.g., and a third mounting point, if present, can comprise a third aperture, and so on). In this implementation, the respective apertures 202, 204 may be used to receive a fastener (e.g., a screw, bolt, pin, or the like) that can secure the base housing 102 to the gas appliance, such as at the vertical surface 450. Additionally, as illustrated in FIG. 1, the respective mounting points 110, 112 can comprise one or more supports 124, 126. That is, the first mounting point 110 can comprise a first (set of) support(s) 124, and the second mounting point 112 can comprise a second (set of) support(s) 126 (e.g., and a third mounting point, if present, can comprise a third (set of) support(s), and so on). In this implementation, the respective supports 124, 126 may provide additional support to the respective mounting points 110, 112, by coupling with the base housing 102.

In an alternate implementation, as illustrated in FIG. 4B, an exemplary ignition module 400 can comprise an alternate mounting design. In this implementation, a bottom surface 402 of the module 400 may comprise a plane with a longitudinal axis that is not parallel to the longitudinal axis of the module 400; such that, when mounted to a vertical surface 450 that is parallel to the longitudinal axis of the module 400, the battery compartment 104 is disposed at a downward slope toward its distal end. That is, for example, the bottom 402 of the base housing 102 is sloped so that when the base housing 102 is mounted on the vertical surface 450, the module is angled downward.

Another implementation, as illustrated in FIG. 4C showing a side view of an exemplary ignition module 420, can comprise alternate mounting design. In this implementation, the exemplary ignition module 420 may be mounted on a vertical surface 450 (e.g., having a vertical Y axis) with the ignition module's 420 longitudinal axis lying horizontally (e.g., in the X axis) across the vertical surface (e.g., mounted horizontally on the vertical surface). In this implementation, the first mounting point 110 and the second mounting point 112 can respectively comprise a leading end 406 and a trailing end 404. The leading end 406 can comprise a thickness "f" that is greater than a thickness "g" of the trailing end 404. In this configuration, in this implementation, the exemplary ignition module 420 can be configured to be mounted in a horizontal configuration on the vertical surface 450. In this way, for example, the housing base 102, and the engaged battery compartment 104, can tilt at a downward slope when mounted on the vertical surface 450.

In one aspect, an ignition module for use in a gas appliance may comprise one or more ignitor terminals respectively configured to couple with an ignitor component. In this aspect, one or more ignitor components may provide an ignition source for the gas appliance when appropriately activated. FIGS. 1-4, and 6-7 illustrate one or more portions of example implementations of a device for controlling an ignition source in a gas appliance. As illustrated, an exemplary ignition controlling device 100, 400, 420, 600, 700 can comprise a device housing 102 that is configured to enclose, at least partially, one or more control components (e.g., ignition control module 712), disposed therein. In one implementation, the housing 102 can be fixedly coupled with a battery compartment 104 configured to hold a battery 702 in an operable position, for example, where the battery can provide a power source for the exemplary ignition controlling device 100, 400, 420, 600, 700.

Further, in this implementation, an exemplary ignition controlling device 100, 400, 420, 600, 700 can comprise one or more ignitor terminals 106 that are engaged with (e.g., fixedly) the housing 102. In one implementation, the one or more ignitor terminals 106 can be disposed on a top surface 108 of the housing 102. Further, in one implementation, the ignition controlling device 100, 600 can comprise a plurality of ignitor terminals 106, where the number of ignitor terminals 106 comprises an even number of ignitor terminals, such as 4 (e.g., in FIG. 2), two (e.g., in FIGS. 6A and 6B), six, or some other set of even numbered ignitor terminals. Additionally, in one implementation, the exemplary ignition-controlling device 100, 600 can comprise a plurality of ignitor terminals 106 that respectively comprise a different color. In this implementation, providing a different color for respective ignitor terminal 106 can provide for color-coding with the coupled ignitor connectors 714. For example, each color (e.g., red, green, yellow, black, blue, etc.) can be assigned to a particular ignitor terminal 106, and a same color code may be used for an ignitor 710 coupled with the terminal 106.

As illustrated in FIGS. 2, 6, and 7, respective ignitor terminals 106 can comprise an ignitor terminal connector 210 that is configured to selectably, operably couple with a corresponding ignitor connector 714. For example, the ignitor terminal connector 210 can comprise an electrically conductive material, such as metal, disposed at a central portion of the ignitor terminal 106. In this example, a conductive portion of the ignitor connector 714 can engage with the electrically conductive material of the ignitor terminal connector 210 to electrically couple the ignition module 100, 600, 700 with a corresponding ignitor 710. In one implementation, the ignitor terminal connector 210 can comprise a cylindrical post that is configured as a male connector; and shape of the cylindrical post can be configured to receive a female ignitor connector 714. For example, the male connector, cylindrical post, can receive an annular-shaped female connector.

As illustrated in FIGS. 2, 6A, 6B, and 7 respective ignitor terminals 106 can comprise a cylindrically shaped ignitor terminal housing 206. In this implementation, the ignitor terminal housing 206 can comprise an ignitor connector guide 208 disposed at an opening to the ignitor terminal housing 206. The ignitor connector guide 208 can be configured to guide the corresponding ignitor connector 714 to the ignitor terminal connector 210 for insertion of the ignitor connector 714 into the ignitor terminal 106. Insertion of the ignitor terminal connector 210 into the ignitor terminal 106 can result in an electrical connection between the device 100, 600, 700 and an ignitor 710. That is, for example, the ignitor connector guide 208 can facilitate connection of the ignitor connector 714 with the ignitor module by guiding it to the ignitor terminal connector 210 post. In this way, for example, it may be easier for a user to connect the ignitors 710 with a module that may be disposed in a location on the appliance that is not easily accessible (e.g., under a shelf, wall, or other hidden part of the appliance).

In one implementation, the ignitor connector guide 208 can be disposed in a top surface of the ignitor terminal housing 206. In this implementation, the top surface can taper inwardly toward the ignitor terminal connector 210 from a perimeter of the top surface. The ignitor connector guide 208 can terminate at a central opening 602 that provides access to the ignitor terminal housing 206 for an ignitor connector 714. The ignitor connector guide 208 can comprise a funnel-shaped portion of the top of the ignitor terminal housing 206, with the funnel leading down to the ignitor terminal connector 210 disposed at the terminus of the funnel. For example, the ignitor connector guide 208 can comprise a concave, sloping portion in the top surface of the ignitor terminal housing 206, of any conical shape that guides the ignitor connector 714 down to the ignitor terminal connector 210. The configuration of the ignitor connector guide 208 can mitigate misalignment of the ignitor connector 714 with the ignitor terminal connector 210. For example, without the ignitor connector guide 208, the ignitor connector 714 can become wedged between the ignitor terminal connector 210 and the wall of the ignitor terminal, which may not allow for the desired electrical coupling.

Figure 6A:
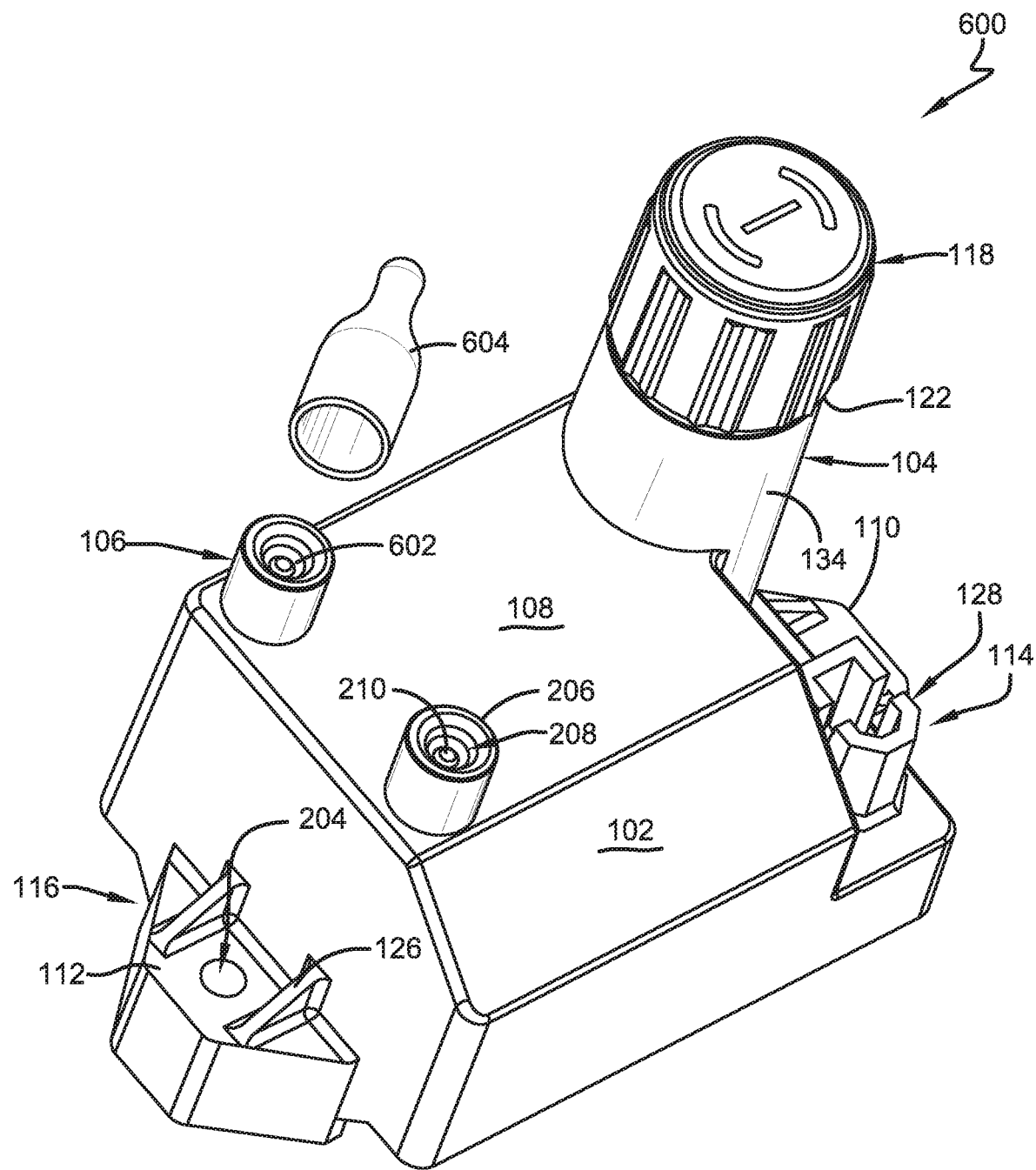
FIGS. 6A and 6B are component diagrams illustrating a perspective view of alternate example implementations of one or more portions of one or more components described herein.
Figure 6B:
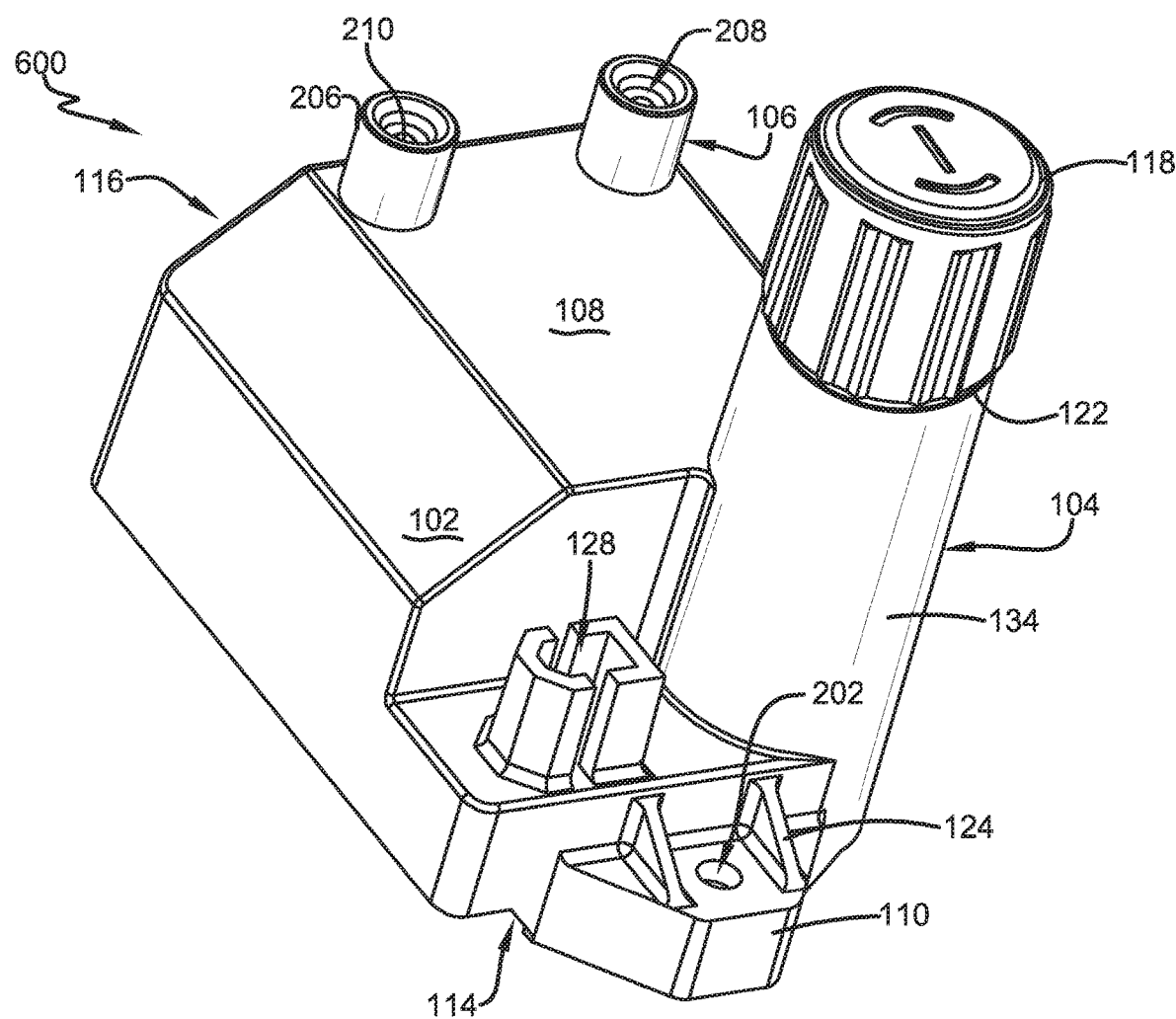

In one implementation, as illustrated in FIGS. 6A and 6B, the cylindrically-shaped ignitor terminal housing 206 can be configured to selectably engage with a connection boot 604. In this implementation, coupling with the ignitor terminal housing 206 with the connection boot can mitigate intrusion of contaminants into the ignitor terminal when it is engaged with a conductor leading to the ignitor connector 714. For example, the connector boot may comprise a cylindrically shaped flexible material, such as silicone, rubber, polymer, or the like, that can snuggly fit over the ignitor terminal housing 206, while the ignitor connector 714 is coupled with the ignitor terminal connector 210. In this way, water, dust, dirt, grease and other contaminants may be substantially blocked from entering ignitor terminal.

In one aspect, a gas appliance ignition apparatus can comprise an ignitor actuator terminal that provides a connection point between the gas appliance ignition apparatus and an ignitor actuator. For example, a gas appliance can comprise a switch coupled to a switch actuator, such as a button, rotary (e.g., knob), or other type of actuator (e.g., rocker, or toggle), that a user can actuate to initiate the ignition source for the gas appliance. That is, for example, a user may use the actuator to activate an ignition switch, which results in the ignition module sending a signal to an ignitor to create an ignition source (e.g., spark or heated glow-bar/coil) for igniting the gas.

FIGS. 1-3, 5 and 7 illustrate one or more portions of example implementations of a gas appliance ignition apparatus. As illustrated, an exemplary ignition controlling apparatus 100, 700 can comprise an apparatus housing 102 that is configured to enclose, at least partially, one or more ignitor control module components (e.g., ignition control module 712), disposed therein. In one implementation, the housing 102 can be fixedly coupled with a battery compartment 104 that is configured to hold a battery 702 in an operable position, for example, where the battery can provide a power source for the exemplary ignition controlling apparatus 100, 700. Further, in one implementation, the exemplary ignition controlling apparatus 100, 700 can comprise one or more ignitor terminals 106 that are engaged with (e.g., fixedly) the housing 102.

In this implementation, an ignitor actuator terminal 128 can be engaged with (e.g., fixedly) the apparatus housing 102. The ignitor actuator terminal 128 can be configured to selectably engage with an ignitor actuator connector 130. The ignitor actuator terminal 128 can comprise an ignitor actuator terminal connector 216 comprising at least two terminal electrical connection points. That is, for example, the ignitor actuator terminal connector 216, comprised in the ignitor actuator terminal 128, can have two electrically conductive connection points, such as pins/posts (e.g., male connectors), blade-types, tabs, contacts, or other types, that are configured to receive two corresponding connection points disposed in the ignitor actuator connector 130.

Additionally, the ignitor actuator terminal 128 can comprise an ignitor actuator terminal housing 212 that is configured to selectably receive the ignitor actuator connector 130. Selectably engaging the ignitor actuator connector 130 with the ignitor actuator terminal housing 212 can result in an electrical connection between the ignition apparatus 100, 700 and an ignitor actuator switch 708. In one implementation, the ignitor actuator connector 130 can comprise a plug, comprising the corresponding connection points for the ignitor actuator connector 130. In this implementation, the plug portion of the ignitor actuator connector 130 may be inserted into the ignitor actuator terminal housing 212, for example, and held in place using a friction fit between the walls of the ignitor actuator terminal housing 212 and the external surface of the plug portion of the ignitor actuator connector 130.

That is, for example the ignitor actuator terminal housing 212 can comprise one or more portions of a wall that extends orthogonally from a surface of the housing 102, to a desired height (e.g., one that provides sufficient friction fit and connection with the plug). Further, for example, inserting the plug portion of the ignitor actuator connector 130 into the ignitor actuator terminal housing 212 can result in an electrical coupling between the connection points of the ignitor actuator terminal connector 216 and the corresponding connection points of the ignitor actuator connector 130.

Figure 5:
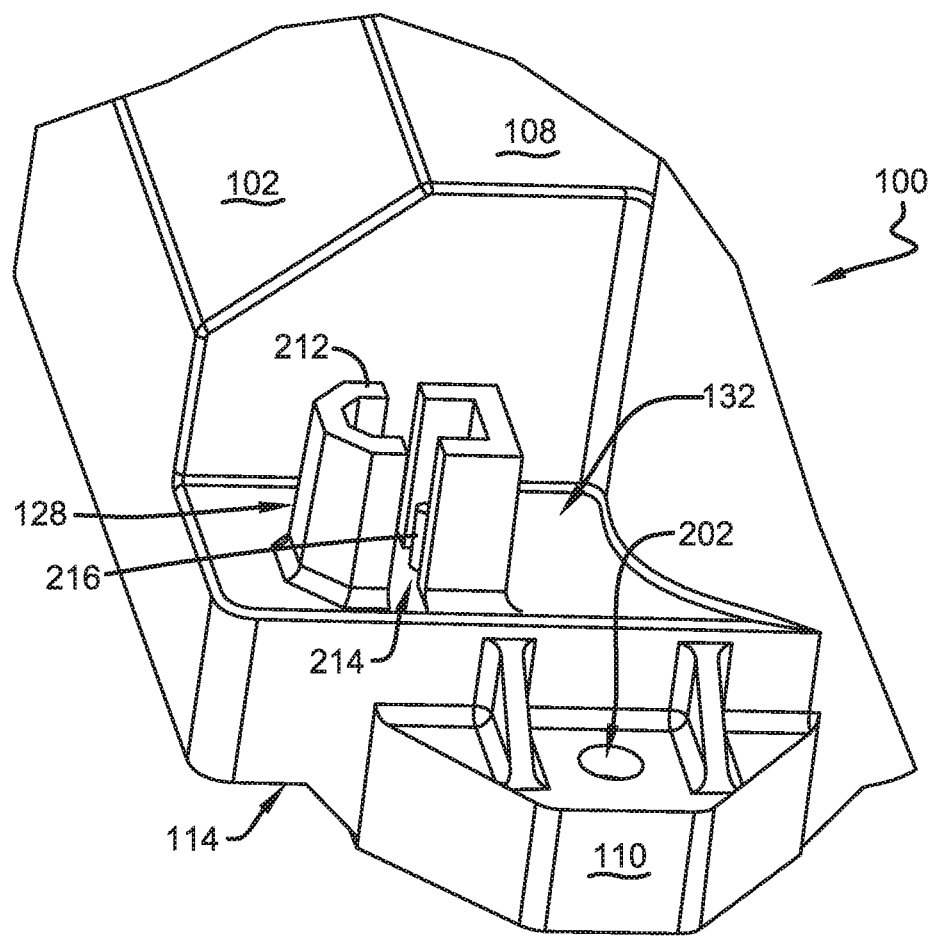
FIG. 5 is a component diagram illustrating another example implementation of one or more portions of one or more components described herein.

In one implementation, as illustrated in FIGS. 2 and 5, the ignitor actuator terminal 128 can comprise at least one channel 214 that is disposed in the actuator terminal housing 212. In this implementation, the channel 214 can be configured to provide drainage from an internal portion of the actuator terminal housing 212. That is, for example, contaminants (e.g., water, grease, other liquids, dust, dirt, debris, etc.) may be introduced into the internal portion of the actuator terminal housing 212 accidently, environmentally, or during use. In this example, contaminants in the internal portion of the actuator terminal housing 212 can lead to a malfunction of, or damage to, components of the ignitor actuator terminal 128 and/or the ignitor actuator connector 130.

In this implementation, in this example, by providing a channel 214 in the housing 212, at least some of the introduced contaminants may drain from the internal portion of the actuator terminal housing 212, thereby mitigating potential malfunctions and/or damage. It should be appreciated that the channel 214 in the ignitor actuator terminal housing 212 is not limited to the implementation depicted in the FIGURES. It is anticipated that those skilled in the art may devise alternate embodiments, such as one or more partial channels, one or more vias disposed in the housing wall(s), one or more grooves, or other channeling components.

In one implementation, the ignitor actuator terminal 128 can be disposed on the top surface 108 of the apparatus housing 102. In one implementation, the ignitor actuator terminal 128 can be disposed on a cutout step-down portion 132 of the apparatus housing 102. The cutout step-down portion 132 of the apparatus housing 102 can be configured to mitigate exposure of the ignitor actuator terminal 128 to contaminants when the apparatus housing 102 is mounted to gas appliance surface (e.g., 450). That is, for example, as illustrated in FIGS. 1-5, when the ignition apparatus 100, 400, and 420 is mounted to the gas appliance vertical surface 450 the cutout step-down portion 132 allows the ignitor actuator terminal 128 to be disposed below the top surface 108 of the housing 102 in a manner that may shield the ignitor actuator terminal 128 from exposure to contaminants falling down from above the mounting location of the ignition apparatus 100, 400, and 420. In this way, in this example, the contaminants may be blocked from interacting with ignitor actuator terminal 128 by the cutout step-down portion 132, thereby mitigating introduction of the contaminants to the interior portion of the ignitor actuator terminal 128.

In one implementation, the ignitor actuator terminal housing 212 can be shaped to allow engagement of the ignitor actuator connector 130 in merely one engagement position. In this implementation, the resulting connection can comprise a desired connection between the ignitor actuator terminal connector 216 and the corresponding connection points in the ignitor actuator connector 130. That is, for example, the walls of the ignitor actuator terminal housing 212 can define a specific shape of its interior portion, which may merely allow a complementary shaped plug to fit into the ignitor actuator terminal housing 212. In this way, for example, where the ignitor actuator terminal connector 216 comprises at least two connection points, is may be desirable to mate the corresponding connection points of the ignitor actuator connector 130. For example, the electrical coupling between the actuator switch 708 and ignition module 100, may utilize a specific arrangement (e.g., polarity) between the connection points; and, if the appropriate connection is not made, the ignition module 100 may not function as desired.

Figure 8A:
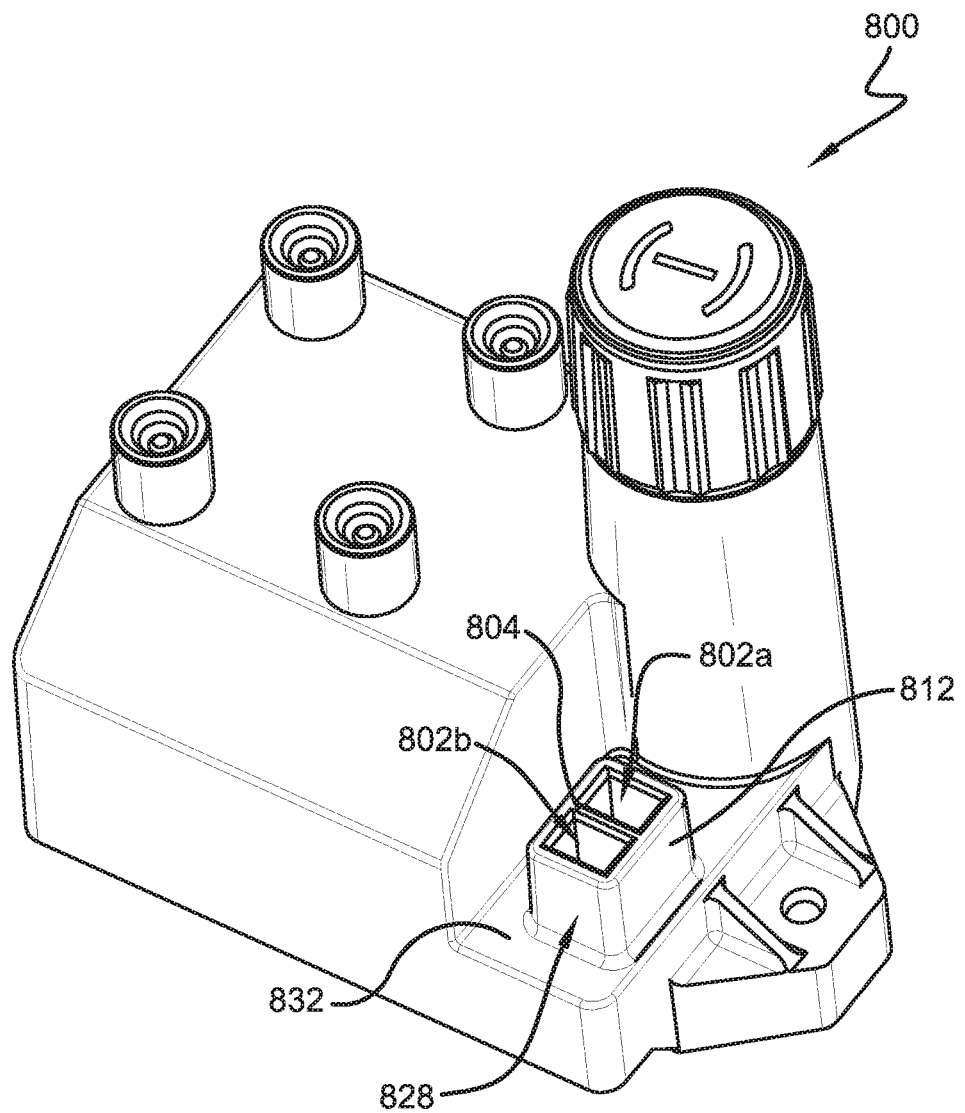
FIGS. 8A, 8B, and 8C are component diagrams illustrating various views of alternate example implementations of one or more portions of one or more components described herein.
Figure 8B:
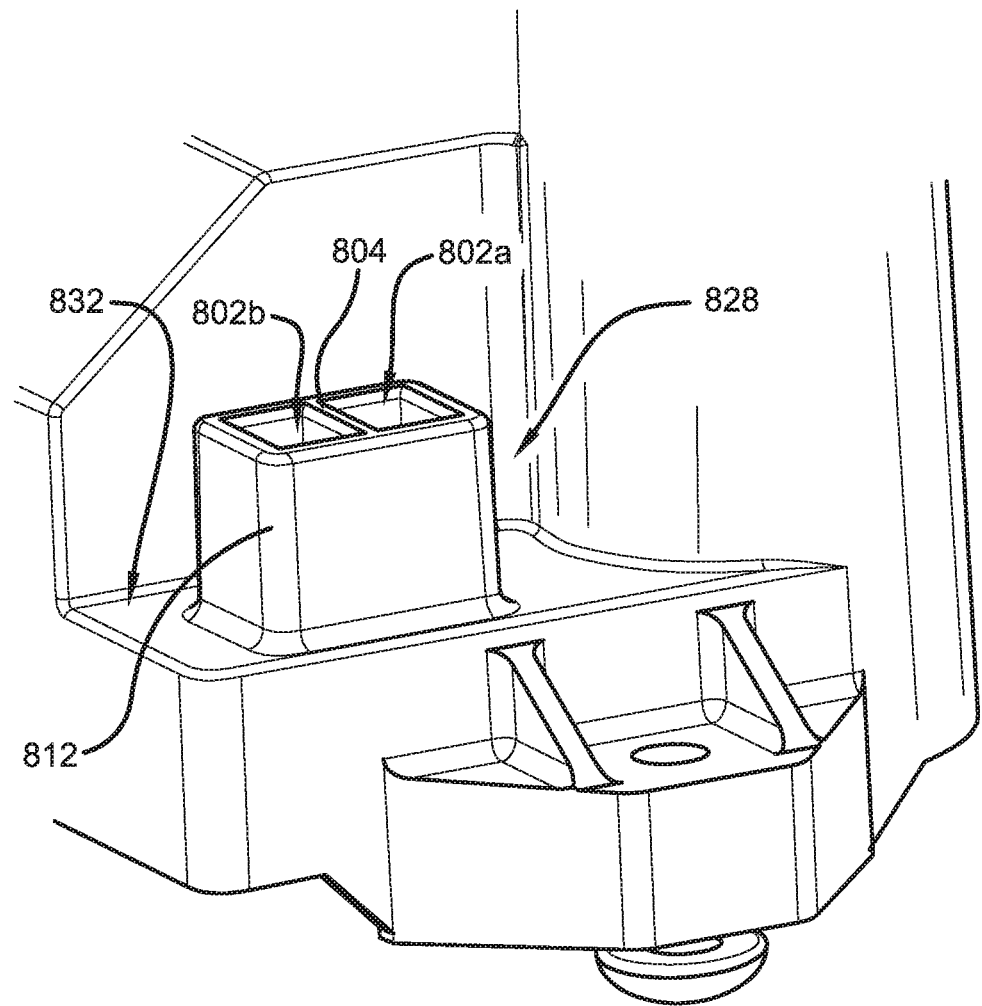
Figure 8C:
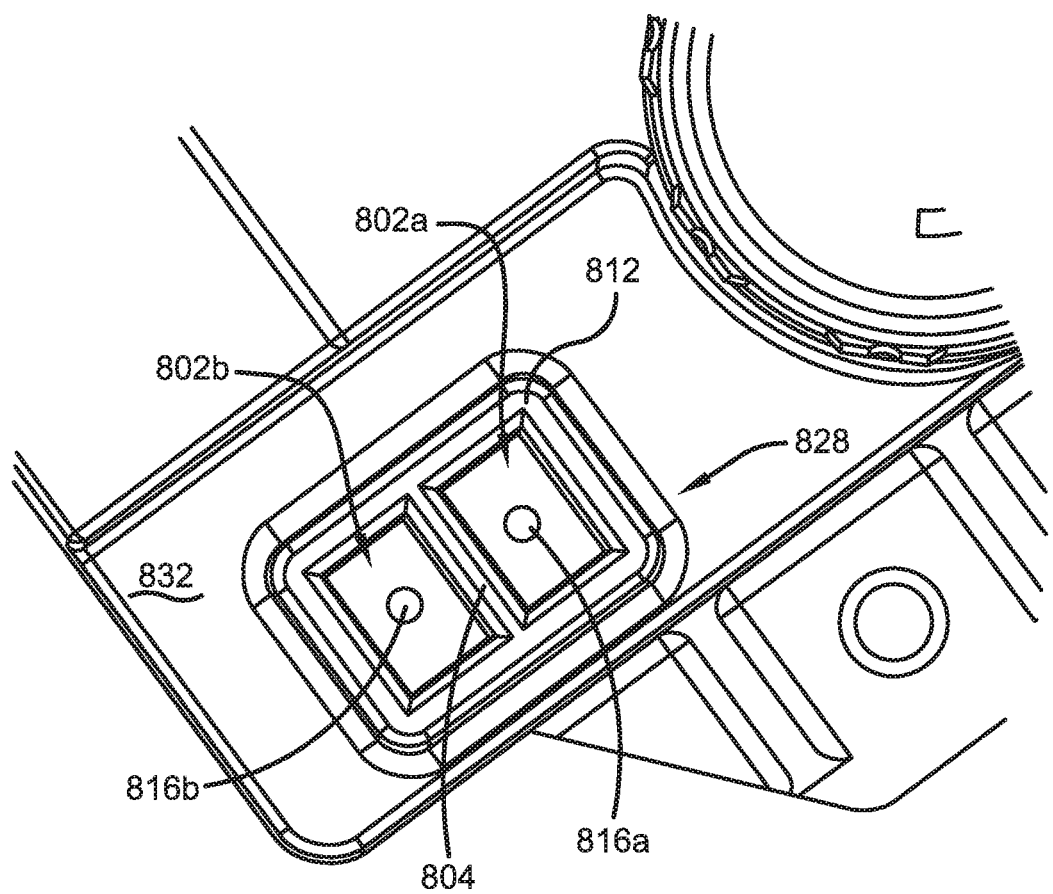

FIGS. 8A, 8B, and 8C are component diagrams illustrating various views of an alternate implementation of an ignition module 800. In this implementation, the ignition module 800 can comprise an alternate ignitor actuator terminal 828. Further, in this implementation, the ignitor actuator terminal 828 can be disposed on a housing actuator terminal platform 832. The ignitor actuator terminal 828 can comprise one or more ignitor actuator terminal connectors 816a, 816b, respectively comprising an electrical connection point. That is, for example, an ignitor actuator terminal connector 816a, 816b, comprised in the ignitor actuator terminal 828, can have an electrically conductive connection points, such as a pin/post (e.g., male connector), blade-type, tab, contact, or other types, that are configured to a corresponding connection point disposed in an ignitor actuator connector (e.g., 130 of FIG. 1).

Further, the ignitor actuator terminal 828 can comprise an ignitor actuator terminal housing 812 that is configured to selectably receive one or more portions of an ignitor actuator connector (e.g., 130). That is, for example, the ignitor actuator terminal 828 can be divided into two connection ports 802a, 802b by a divider 804. The connection ports 802a, 802b may respectively selectably receive a portion of an ignitor actuator connector. Selectably engaging the ignitor actuator connector with the ports 802a, 802b in the ignitor actuator terminal housing 812 can result in an electrical connection between an ignition apparatus (e.g., 800) and an ignitor actuator switch (e.g., 708 of FIG. 7). In one implementation, the ignitor actuator connector can comprise one or more plugs, comprising the corresponding connection points for the ignitor actuator connector. In this implementation, the plug portion of the ignitor actuator connector may comprise two sections, each of which may be inserted into corresponding ports 802a, 802b in the ignitor actuator terminal housing 812.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. An ignition module for use on a gas appliance, comprising:
   a housing configured to be fixedly mounted on a surface of the gas appliance; and
   a battery compartment engaged with the housing, the battery compartment having a first end portion and a second end portion, the second end portion of the battery compartment comprises a positive electrical contact terminal, the first end portion of the battery compartment disposed at a lower elevation than the second end portion of the battery compartment, the first end portion of the battery compartment comprising a battery access portion, the battery access portion comprising a negative electrical contact terminal for the module.

2. The module of claim 1, the housing comprising one or more module mounting point components, configured to be used to mount the housing on a vertical surface of the gas appliance such that a first end of the battery compartment, comprising the battery access portion, is disposed at a lower elevation than an opposing, second end of the battery compartment.

3. The module of claim 2, wherein the one or more module mounting point components comprises a first module mounting foot and a second module mounting foot, the second module mounting foot comprising a greater thickness than the first module mounting foot, the thickness measured from a mounting surface of the respective module mounting feet.

4. The module of claim 2, wherein respective one or more module mounting point components comprises a leading end and a trailing end, the leading end comprising a thickness greater than the trailing end, and configured to be mounted in a horizontal configuration on a vertical surface.

5. The module of claim 1, wherein the housing comprises a bottom surface that is configured to be angularly mounted to the surface of the gas appliance.

6. The module of claim 5, wherein the housing comprises one or more module mounting point components to angularly mount the bottom surface of the housing to the surface of the gas appliance.

7. The module of claim 6, wherein the one or more module mounting point components comprises a first module mounting foot and a second module mounting foot, the second module mounting foot comprising a greater thickness than the first module mounting foot, the thickness measured from a mounting surface of the respective module mounting feet.

8. The module of claim 6, wherein respective one or more module mounting point components comprises a leading end and a trailing end, the leading end comprising a thickness greater than the trailing end, and configured to be mounted in a horizontal configuration on a vertical surface.

9. The module of claim 1, wherein the battery access portion comprises an electrical coupler configured to electrically couple the negative electrical contact terminal in the battery access portion with the module when the battery access portion is selectably engaged with the battery compartment.

10. The module of claim 1, wherein the battery access portion comprises a selectably removable cap that is configured to collect material leaked from a battery disposed in the battery compartment.

11. The module of claim 1, further comprising a gasket disposed on the battery compartment that is configured to engage with the battery access portion to mitigate migration of contaminants between the outside and inside of the battery compartment.

12. An ignition module for use on a gas appliance, comprising:
   a housing configured to be fixedly mounted on a surface of the gas appliance;
   a battery compartment engaged with the housing, the battery compartment having a first end portion and a second end portion, the first end portion of the battery compartment disposed at a lower elevation than the second end portion of the battery compartment, the battery compartment configured to hold a battery in its operable position with the battery's negative terminal disposed at the first end portion of the battery compartment, the first end portion of the battery compartment comprising a battery access portion that is configured to be selectably opened and closed such that the battery is selectably insertable into the battery compartment when the battery access portion is open;
   wherein the battery's negative terminal is proximate to the battery access portion; and one or more module mounting point components which mount the housing so as to dispose the battery compartment at an angle that provides a downward slope to the battery compartment.

13. The module of claim 12, wherein the battery access portion comprises a negative electrical contact terminal that is configured to electrically couple the negative electrical contact terminal with the module when the battery access portion is selectably engaged with the battery compartment.

14. The module of claim 12, wherein the battery access portion comprises a selectably removable cap that is configured to collect material leaked from a battery disposed in the battery compartment.

15. The module of claim 1, wherein the battery compartment is configured to hold a battery in its operable position with the battery's negative terminal disposed at a lower elevation than the battery's positive terminal when the housing is mounted for operation on the gas appliance.

16. The module of claim 1, wherein the battery access portion is operable to selectably access the battery compartment.

* * * * *